US012777446B2

(12) United States Patent
Gan et al.

(10) Patent No.: US 12,777,446 B2
(45) Date of Patent: Oct. 27, 2026

(54) SYSTEM AND METHOD FOR IDENTIFYING USER EQUIPMENT

(71) Applicant: Industrial Technology Research Institute, Hsinchu (TW)

(72) Inventors: Chai-Hien Gan, Hsinchu City (TW); Bo-Wei Chen, Changhua County (TW)

(73) Assignee: Industrial Technology Research Institute, Hsinchu (TW)

( * ) Notice: Subject to any disclaimer, the term of this patent is extended or adjusted under 35 U.S.C. 154(b) by 293 days.

(21) Appl. No.: 18/389,786

(22) Filed: Dec. 20, 2023

(65) Prior Publication Data

US 2025/0168798 A1 May 22, 2025

(30) Foreign Application Priority Data

Nov. 22, 2023 (TW) ................................ 112145219

(51) Int. Cl.
*H04W 60/00* (2009.01)
*H04W 8/26* (2009.01)

(52) U.S. Cl.
CPC ............ *H04W 60/00* (2013.01); *H04W 8/26* (2013.01)

(58) Field of Classification Search
CPC ................................ H04W 60/00; H04W 8/26
USPC ...................................................... 455/435.1
See application file for complete search history.

(56) References Cited

U.S. PATENT DOCUMENTS

| | | | |
|---|---|---|---|
| 7,647,462 B2 | 1/2010 | Wolfgang et al. |
| 9,661,666 B2 | 5/2017 | Ahmavaara |
| 10,313,323 B2 | 6/2019 | Forssell et al. |
| 11,464,056 B2 | 10/2022 | Song et al. |

(Continued)

FOREIGN PATENT DOCUMENTS

| | | |
|---|---|---|
| CN | 113613179 | 5/2022 |
| CN | 116234060 | 6/2023 |
| EP | 3937523 | 1/2022 |
| EP | 4128723 | 2/2023 |

(Continued)

OTHER PUBLICATIONS

David Johnson et al., "NexRAN: Closed-loop RAN slicing in POWDER-A top-to-bottom open-source open-RAN use case", Proceedings of the 15th ACM Workshop on Wireless Network Testbeds, Jan. 2022, pp. 17-23.

(Continued)

*Primary Examiner* — Joel Ajayi
(74) *Attorney, Agent, or Firm* — JCIPRNET

(57) ABSTRACT

Disclosed is method for identifying a user equipment (UE), including: generating a RAN UE ID corresponding to the UE through a base station; when the UE submits a register request with an enrichment information provider, receiving a packet of the UE through the base station, obtaining the IP address corresponding to the UE based on the packet and transmitting the packet to a core network; transmitting the IP address and the RAN UE ID corresponding to the UE to a RIC through the base station; establishing a mapping association associated with the IP address and the RAN UE ID corresponding to the UE in a mapping table through the RIC; and transmitting the packet to the enrichment information provider through the core network, and obtaining the IP address corresponding to the UE based on the packet and accepting the register request with the IP address through the enrichment information provider.

10 Claims, 4 Drawing Sheets

(56) References Cited

U.S. PATENT DOCUMENTS

| | | | |
|---|---|---|---|
| 2011/0261800 A1 | 10/2011 | You et al. | |
| 2021/0014912 A1* | 1/2021 | Song | H04W 48/16 |
| 2022/0014903 A1 | 1/2022 | Chandrashekar et al. | |
| 2023/0110771 A1* | 4/2023 | Chung | H04W 28/02 370/329 |
| 2023/0322259 A1 | 10/2023 | Sadek et al. | |

FOREIGN PATENT DOCUMENTS

| | | |
|---|---|---|
| JP | 2023519594 | 5/2023 |
| JP | 7451790 | 3/2024 |
| TW | 1812665 | 8/2023 |
| TW | I815625 | 9/2023 |
| WO | 2010074512 | 7/2010 |
| WO | 2021198947 | 10/2021 |

OTHER PUBLICATIONS

Ingo Friese et al., "Cross-Domain Discovery of Communication Peers: Identity Mapping and Discovery Services (IMaDS)", IEEE 2017 European Conference on Networks and Communications (EuCNC), Jun. 12-15, 2017, pp. 1-6.

Byeong-Ok Kwak et al., "An Efficient Lookup Mechanism for Hierarchical ID Mapping System", IEEE 2013 International Conference on ICT Convergence (ICTC), Oct. 14-16, 2013, pp. 981-983.

Zombo Fu et al., "Application Independent Identity Management", 2010 IEEE International Conference on Information Theory and Information Security, Dec. 17-19, 2010, pp. 625-628.

L. Atzori et al., "Leveraging social notions to improve ID-to-locator mapping in IoT Identity Oriented Networks", 2018 IEEE 4th World Forum on Internet of Things (WF-IoT), Feb. 5-8, 2018, pp. 421-426.

Zhenghang Yan et al., "A Conflict-Free Radio Network Temporary Identity Allocation Algorithm for User Equipments", 2018 IEEE/CIC International Conference on Communications in China (ICCC), Aug. 16-18, 2018, pp. 598-603.

"Notice of allowance of Japan Counterpart Application", issued on Nov. 5, 2024, p. 1-p. 3.

"Search Report of Europe Counterpart Application", issued on Jun. 20, 2024, p. 1-p. 7.

* cited by examiner

SYSTEM AND METHOD FOR IDENTIFYING USER EQUIPMENT

CROSS-REFERENCE TO RELATED APPLICATION

This application claims the priority benefit of Taiwan application serial no. 112145219, filed on Nov. 22, 2023. The entirety of the above-mentioned patent application is hereby incorporated by reference herein and made a part of this specification.

TECHNICAL FIELD

The present disclosure relates to a technology for identifying a user equipment (UE), and in particular, to a system and method through which an enrichment information provider identifies a UE in a radio access network.

BACKGROUND

Open Radio Access Network (O-RAN) provides open interfaces and software and hardware, which allows telecommunications equipment to be purchased and upgraded more easily, thereby reducing overall construction costs, and also allowing radio access network to optimally manage radio resources according to application requirements. O-RAN also provides an Enrichment Information (EI) interface to obtain external enrichment information services to improve RAN optimization.

For security reasons, the radio access network uses a temporary identification identifier as the radio access network UE identifier (RAN UE ID). When the connection changes, the RAN UE ID will be dynamically updated, as a result, the external enrichment information provider cannot obtain its RAN UE ID to identify a specific UE.

When the radio access network interacts with an external enrichment information provider, the radio access network is unable to correspond to the association between the enrichment information UE identifier (EI UE ID) and the RAN UE ID. Therefore, it is impossible to adjust the behavior of the specific UE in the radio access network based on the status of the enrichment information.

Specifically, in the O-RAN architecture, the RIC may use RAN-related IDs (for example: AMF UE NGAP ID, gNB-CU-CP UE E1AP ID, RAN UE ID, etc.) to identify the UE. In the enrichment information provider, the UE IP address, IMSI, and phone number may be used as the ID to identify the UE. However, since there are no common rules, it is impossible to know the correspondence between IDs. Therefore, when the RIC receives the information sent by the enrichment information provider through the EI interface, it is impossible to tell which UE is related to the received information.

Therefore, it is important to find out how to establish the correspondence between RAN UE ID and IP address, so that RAN may use the enrichment information provided by the enrichment information provider to effectively configure resources and improve network system performance and user experience.

SUMMARY

The present disclosure provides a system for identifying user equipment (UE), including a base station and a radio access network intelligent controller (RIC). The base station is configured to generate RAN UE identifier (RAN UE ID) of the UE, and the RIC network is connected to the base station. The base station obtains the RAN UE ID corresponding to the UE from the RIC; when the UE submits a registration request to the enrichment information provider, the base station receives the packet of the UE, obtains the IP address corresponding to the UE based on the packet, and transmits the packet to the core network. The base station transmits the IP address and the RAN UE ID corresponding to the UE to the RIC. The RIC establishes a mapping association associated with the IP address of the UE and the RAN UE ID in the mapping table. The core network transmits the packet to the enrichment information provider, and the enrichment information provider obtains the IP address corresponding to the UE according to the packet, and accepts the registration request of the UE with the IP address.

In an embodiment of the present disclosure, when the enrichment information provider transmits enrichment information and the IP address to the RIC, RIC queries the mapping association in the mapping table according to the IP address to obtain the RAN UE ID, and the base station transmits the enrichment information to the UE corresponding to the RAN UE ID.

In an embodiment of the present disclosure, when the base station receives the networking request of the UE, the base station transmits the RAN UE ID corresponding to the UE to the RIC, and the RIC responds to the base station to complete the networking request.

In an embodiment of the present disclosure, the base station transmits the RAN UE ID corresponding to the UE to the RIC through the E2 interface.

In an embodiment of the present disclosure, the base station transmits the IP address and the RAN UE ID corresponding to the UE to the RIC through the E2 interface.

The present disclosure further provides a method for identifying user equipment (UE), including: generating a RAN UE identifier (RAN UE ID) corresponding to the UE through a base station; when the UE submits a registration request to the enrichment information provider, the base station receives the packet of the UE, obtains the IP address corresponding to the UE based on the packet, and transmits the packet to the core network. The base station transmits the IP address and the RAN UE ID corresponding to the UE to the RIC. The RIC establishes a mapping association associated with the IP address of the UE and the RAN UE ID in the mapping table. The core network transmits the packet to the enrichment information provider, and the enrichment information provider obtains the IP address corresponding to the UE according to the packet, and accepts the registration request of the UE with the IP address.

Based on the above, the method and system for identifying UE provided by the present disclosure may obtain the RAN UE ID from the RIC when the UE is connected to the base station. After the UE transmits the packet, the packet passes through the base station, and the base station obtains the IP address in the packet, and establish a mapping table between the RAN UE ID and the IP address in the RIC. When the enrichment information provider uses the IP address associated with the UE to communicate with the RIC, it can be acquired by looking up the table which UE needs to be used for radio resource control.

DETAILED DESCRIPTION OF DISCLOSED EMBODIMENTS

Some exemplary embodiments of the present disclosure will be described in detail with reference to the accompanying drawings. The component symbols cited in the following description will be regarded as the same or similar components when the same component symbols appear in different drawings. These exemplary embodiments are only part of the present disclosure and do not disclose all possible implementations of the present disclosure. Rather, these exemplary embodiments are merely examples of methods, devices, and systems within the scope of claims of the present disclosure.

Figure 1:
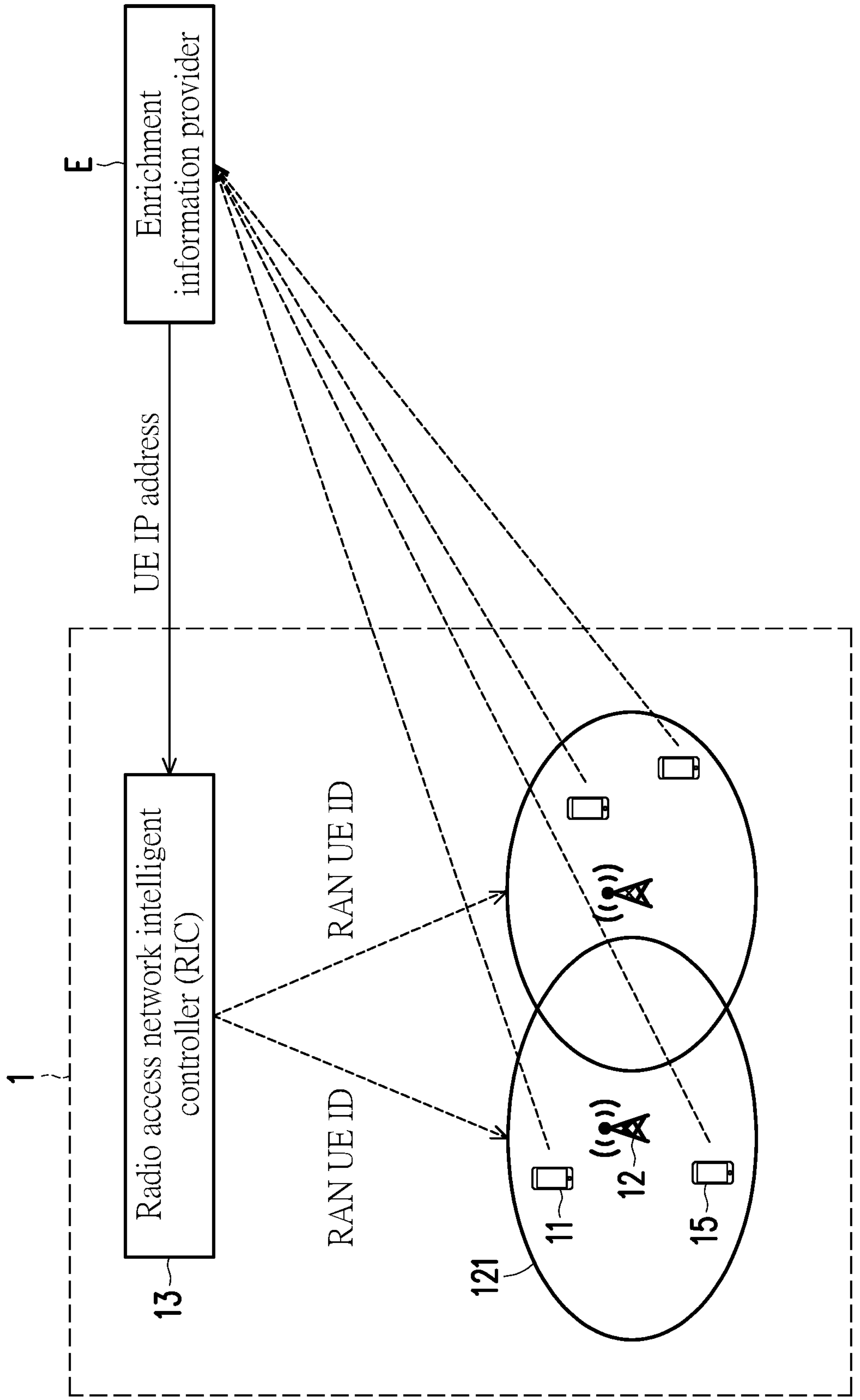
FIG. 1 is a schematic view of a system for identifying UE according to an embodiment of the present disclosure.

FIG. 1 is a schematic view of a system 1 for identifying UE 11 and UE 15 according to an embodiment of the present disclosure. Please refer to FIG. 1. The system 1 that identifies the UE 11 includes a base station 12 and a radio access network intelligent controller (RIC) 13, wherein the RIC 13 network is connected to the base station 12.

In terms of hardware architecture, the 5G NR communication system mainly includes radio access network (RAN) and the core network. The RAN 121 is mainly composed of the base station 12, which provides wireless access services and related management functions for UE 11, while the core network (not shown in the figure) mainly provides Internet access services and related management functions for the UE 11. The base station 12 may be a Next Generation Node B (gNB) 5G base station in the 5G NR communication system, and the core network may be a Next Generation Core (NGC).

The RIC 13 is a software-defined assembly in the O-RAN architecture, responsible for controlling and optimizing RAN functions, making RAN operable, intelligent, agile and programmable, and equipped with real-time and non-real-time management functions. The RIC 13 is configured to generate the RAN UE Identifier (RAN UE ID) of the UE 11.

Figure 2:
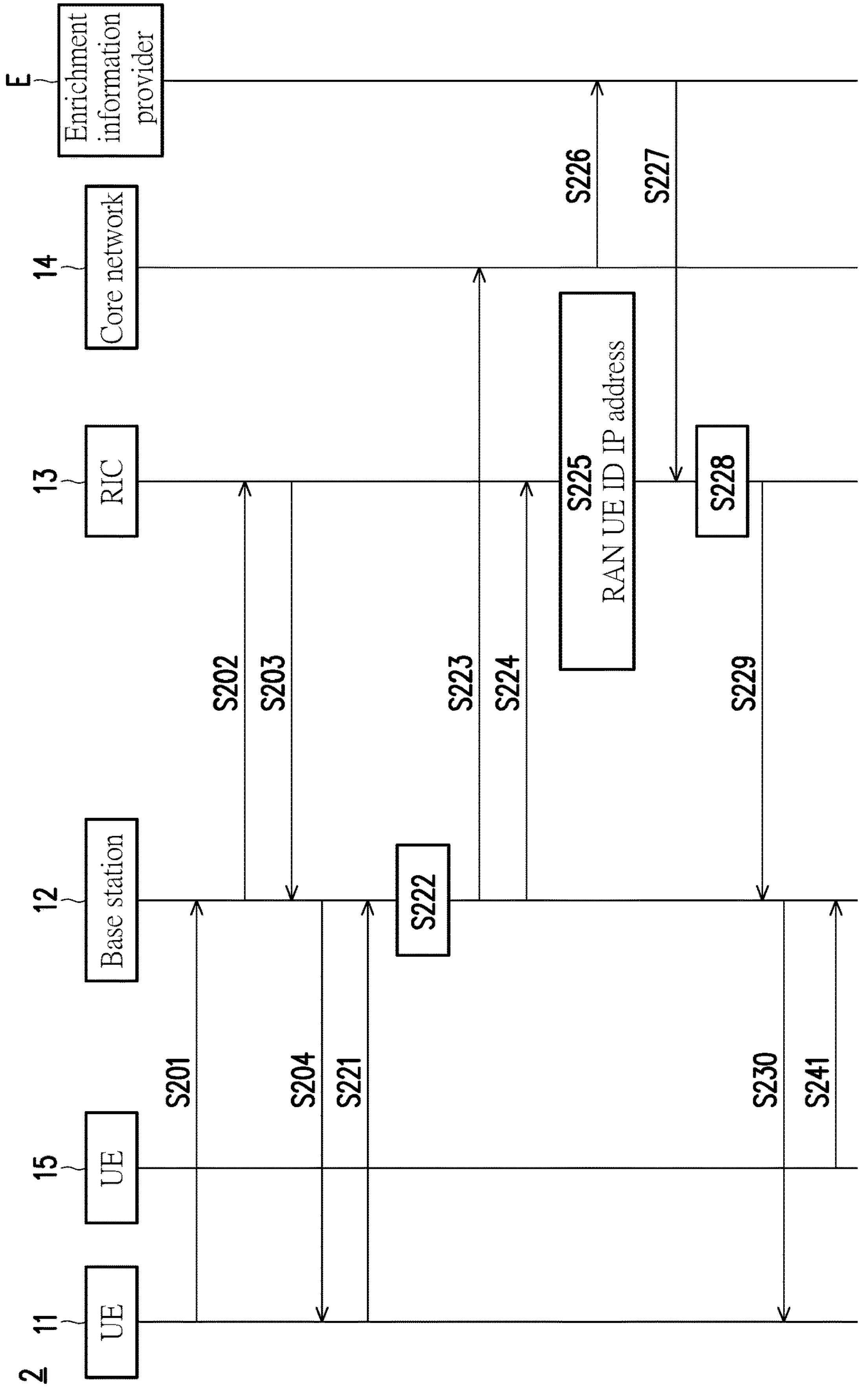
FIG. 2 is a flow chart of a method for identifying UE according to an embodiment of the present disclosure.

FIG. 2 is a flow chart of a method 2 for identifying UE 11 and 15 according to an embodiment of the present disclosure. Specifically, through the base station 12 in the system 1 that identifies the UE 11 and 15 as well as the method 2 that uses the RIC 13 to cooperatively assist in identifying the UE 11 and 15, it is possible for the RIC 13 to establish a mapping association between the RAN UE ID and the IP addresses of the UE 11 and UE 15 in the mapping table, so that the enrichment information provider E is able to identify UE 11 and UE 15 in the radio access network. The method 2 for identifying UE 11 and UE 15 includes steps S201 to S204, S221 to S230, and S241.

Please refer to FIG. 1 and FIG. 2 at the same time. Before UE 11 and UE 15 complete the connection establishment with the base station 12, the mapping association between the RAN UE ID and the IP addresses of UE 11 and UE 15 has not been established in the mapping table of the RIC 13. First, the establishment of the connection between the UE 11 and the base station 12 is described.

In step S201, if the UE 11 is to obtain network services from the base station 12, the UE 11 initiates a connection establishment/re-establishment request to the base station 12, that is, a networking request. In step S202, after the base station 12 receives the networking request of the UE 11, the base station 12 generates a RAN UE ID assigned to the UE 11 and transmits the RAN UE ID assigned to the UE 11 through the E2 interface of the RIC 13 to the RIC 13. In an embodiment, the base station 12 transmits the RAN UE ID corresponding to the UE 11 to the RIC 13 through the E2 interface. In step S203, the RIC 13 responds to the base station 12. In step S204, the networking request is completed.

Once step S204 is completed, that is, after the UE 11 and the base station 12 complete the network connection establishment, the mapping association between the RAN UE ID and the IP address of the UE 11 may be established in the mapping table of the RIC 13.

In step S221, when the UE 11 submits a registration request to the enrichment information provider E, the base station 12 receives the packet of the UE 11.

In step S222, the base station 12 receives the packet of the UE 11 and obtains the IP address corresponding to the UE 11 based on the packet. In step S223, the base station 12 transmits the packet to the core network 14.

In step S224, the base station 12 transmits the IP address and the RAN UE ID corresponding to the UE 11 to the RIC 13. In an embodiment, the base station 12 transmits the IP address and the RAN UE ID corresponding to the UE 11 to the RIC 13 through the E2 interface. In step S225, the RIC 13 establishes a mapping association associated with the IP address of the UE 11 and the RAN UE ID in the mapping table. Table 1 is an example of the mapping table of the RIC 13, which includes the mapping association associated with the IP address of the UE 11 and the RAN UE ID.

TABLE 1

| RAN UE ID | IP address of UE 11 |
|---|---|
| 21485977652 | 10.101.129.75 |
| . . . | . . . |

In step S226, the core network 14 transmits the packet to the enrichment information provider E, and the enrichment information provider E obtains the IP address corresponding to the UE 11 according to the packet. In step S227, the enrichment information provider E accepts the registration request of UE 11 with the IP address corresponding to the UE 11.

In step S228, when the enrichment information provider E transmits the enrichment information and the IP address corresponding to the UE 11 to the RIC 13, the RIC 13 queries the mapping association in the mapping table according to the IP address corresponding to the UE 11 to obtain the RAN UE ID corresponding to the UE 11. Specifically, when the RIC 13 is to perform resource control on the UE 11, the RIC 13 may obtain the RAN UE ID corresponding to the UE 11 from the mapping table according to the IP address corresponding to the UE 11, and in step S229, transmit the control request carrying the RAN UE ID to the base station 12. In step S230, the base station 12 transmits the enrichment information to the UE 11 corresponding to the RAN UE ID, and makes relevant configurations for the UE 11.

When another user equipment UE 15 wants to obtain network services from the base station 12, in step S241, the UE 15 initiates a networking request to the base station 12 and completes the networking request by executing operations similar to steps S202 to S204. Once the UE 15 and the base station 12 complete the network connection establishment, the operations similar to steps S221 to S225 may be executed to establish a mapping association between the RAN UE ID and the IP address of the UE 15 in the mapping table of the RIC 13. Then, the operations similar to steps S226 to S230 are performed to transmit the packet of the UE 15 to the enrichment information provider E through the core network 14. The enrichment information provider E obtains the IP address corresponding to the UE 15 according to the packet and uses the IP address corresponding to the UE 15 to accept the registration request of the UE 15. When the enrichment information provider E transmits enrichment information and the IP address corresponding to the UE 15 to the RIC 13, the RIC 13 queries the mapping association in the mapping table according to the IP address corresponding to the UE 15 to obtain the RAN UE ID corresponding to the UE 15.

The procedure in which the UE switches from one network to another is called a handover procedure. Normally the UE measures the signal strength of surrounding base stations to decide whether to carry out the handover procedure, and the intervals between which the UE makes a report may be 20 ms, 40 ms, 80 ms, 160 ms, etc.

Figure 3:
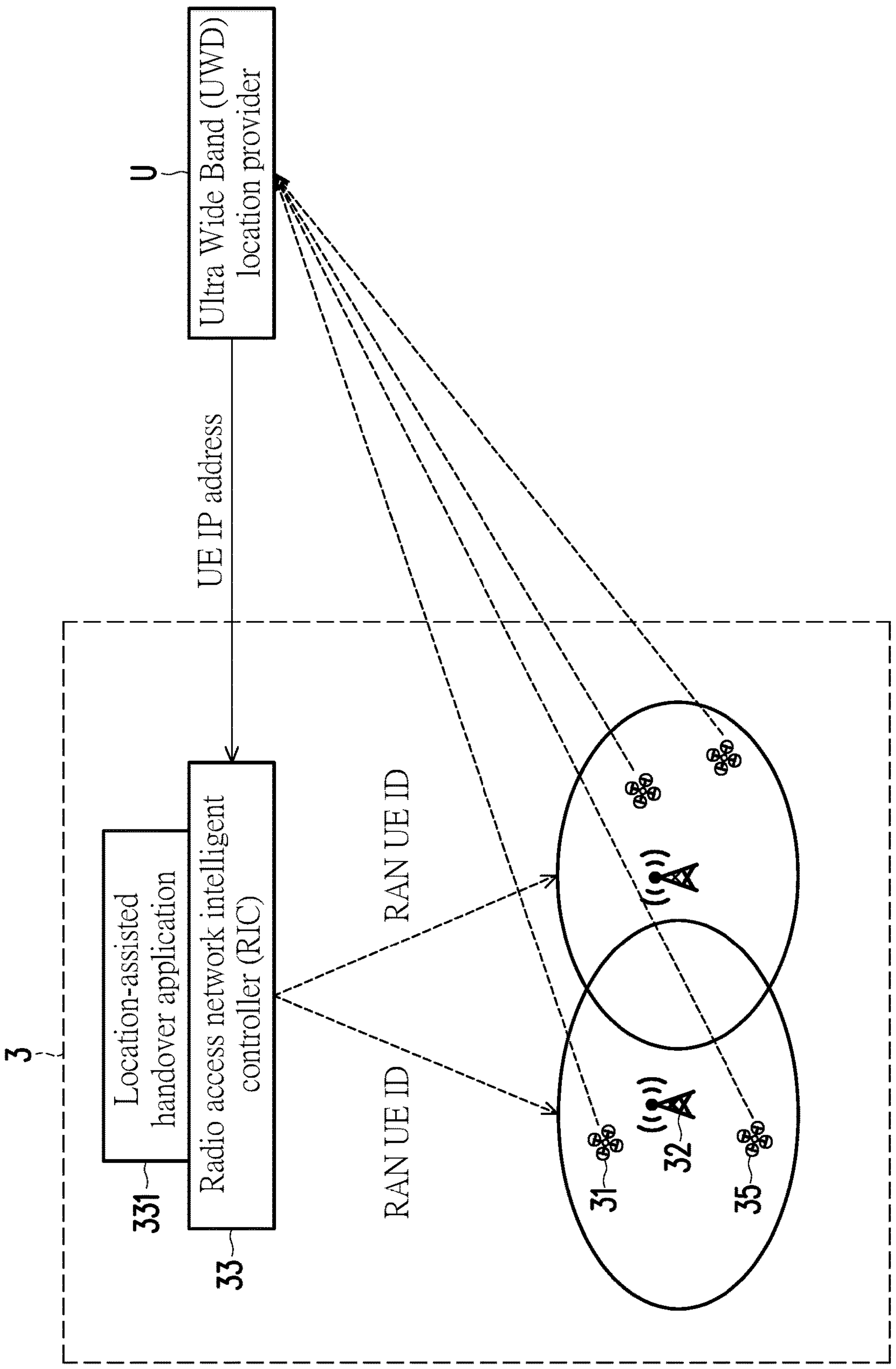
FIG. 3 is a schematic view of a system that uses a location-assisted handover application on a RIC to make handover decisions to identify unmanned aerial vehicles according to an embodiment of the present disclosure.

FIG. 3 is a schematic view of a system 3 that uses a location-assisted handover application 331 on the RIC 33 to make handover decisions to identify unmanned aerial vehicles (UAV) 31 and UAV 35 according to an embodiment of the present disclosure. Please refer to FIG. 1. The system 3 for identifying the UAV 31 and the UAV 35 includes a base station 32 and a RIC 33. The RIC 33 is connected to the base station 32 through the network, and the RIC 33 has a location-assisted handover APP 331. This example uses Ultra Wide Band (UWD) location provider U to provide the location information of the UAV 31 and the UAV 35. The location-assisted handover APP 331 on the RIC 33 makes the handover decision, and the interval between which the UWD location provider U makes a report to the UAV 31 and the UAV 35 may be 10 ms.

Figure 4:
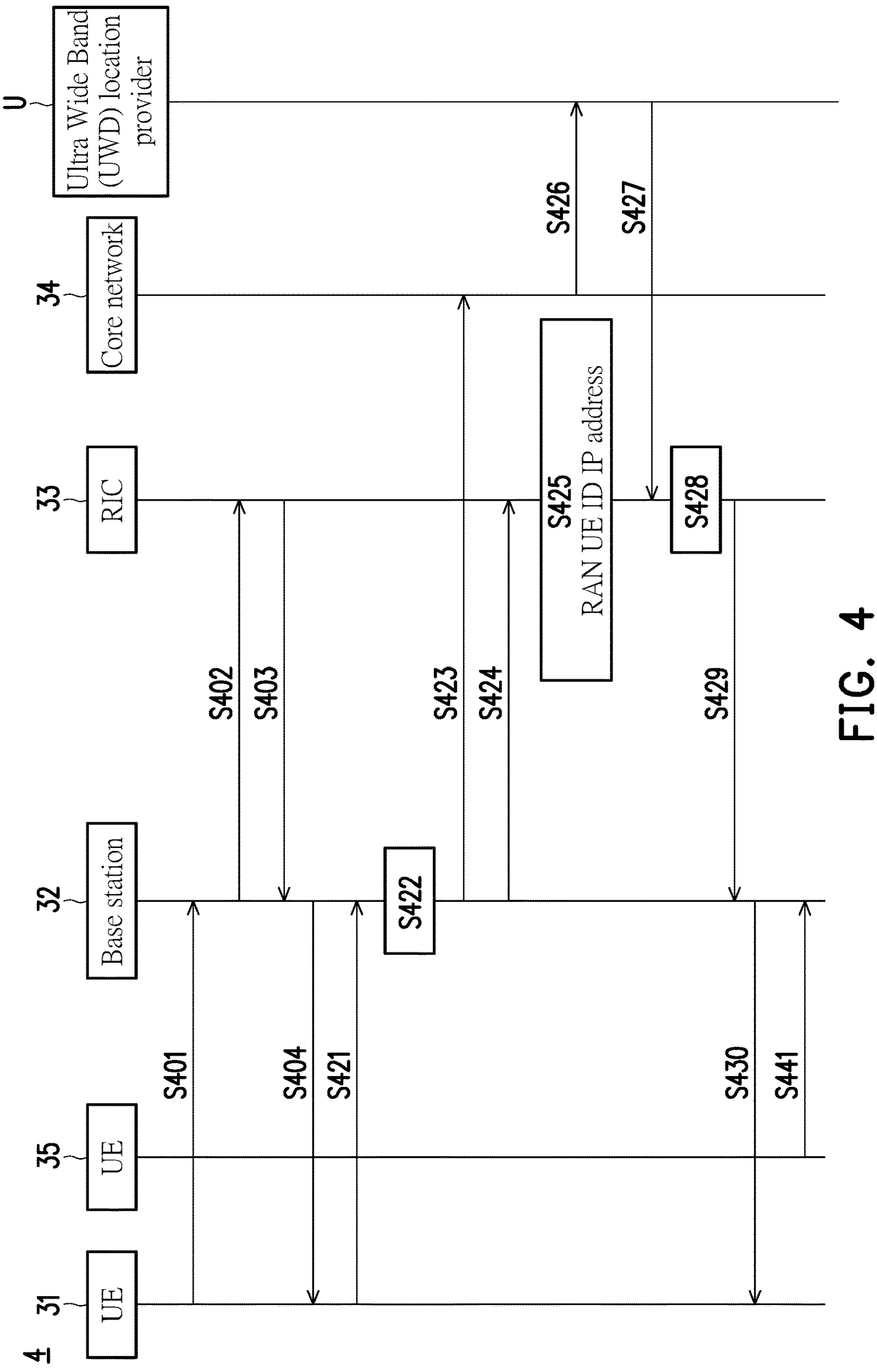
FIG. 4 is a flow chart of a method for identifying an unmanned aerial vehicle according to an embodiment of the present disclosure.

FIG. 4 is a flow chart of a method 4 for identifying the UAV 31 and the UAV 35 according to an embodiment of the present disclosure. Specifically, through the base station 32 in the system 3 that identifies the UAV 31 and the UAV 35 and the method 2 that uses the RIC 33 to cooperatively assist in identifying the UAV 31 and the UAV 35 in conjunction with FIG. 2, it is possible for the RIC 33 to establish the mapping association between the RAN UE ID and the IP addresses of the UAV 31 and the UAV 35 in the mapping table, so that the UWD location provider U is able to identify the UAV 31 and the UAV 35 in the radio access network. The method 4 for identifying the UAV 31 and the UAV 35 includes steps S401 to S404, S421 to S430, and S441.

Please refer to FIG. 3 and FIG. 4 at the same time. Before the connection establishment between the UAV 31 and the UAV 35 and the base station 32 is completed, the mapping association between the RAN UE ID and the IP addresses of the UAV 31 and the UAV 35 has not yet been established in the mapping table of the RIC 33. First, the connection establishment between the UAV 31 and the base station 32 is described.

In step S401, if the UAV 31 wants to obtain network services from the base station 32, the UAV 31 initiates a connection establishment/re-establishment request to the base station 32, that is, a networking request. In step S402, when the base station 32 receives the networking request of the UAV 31, the base station 12 will generate the RAN UE ID assigned to the UAV 31 (for example: 21485977652), and use the E2 interface of the RIC 33 to transmit the RAN UE ID assigned to the UAV 31 to the RIC 33. In an embodiment, the base station 32 transmits the RAN UE ID corresponding to the UAV 31 to the RIC 33 through the E2 interface. In step S403, the RIC 33 responds to the base station 32. In step S404, the networking request is completed.

Once step S404 is completed, that is, after the UAV 31 and the base station 32 complete the network connection establishment, the mapping association between the RAN UE ID and the IP address of the UAV 31 may be established in the mapping table of the RIC 33.

In step S421, when the UAV 31 submits a registration request to the UWD location provider U, the base station 32 receives the packet of the UAV 31.

In step S422, the base station 32 receives the packet of the UAV 31 and obtains the IP address corresponding to the UAV 31 (for example: 10.101.129.7) based on the packet. In step S423, the base station 32 transmits the packet to the core network 34.

In step S424, the base station 32 transmits the IP address and the RAN UE ID corresponding to the UAV 31 to the RIC 33. In an embodiment, the base station 32 transmits the IP address and the RAN UE ID corresponding to the UAV 31 to the RIC 33 through the E2 interface. In step S425, the RIC 33 establishes a mapping association associated with the IP address of the UAV 31 and the RAN UE ID in the mapping table. Table 1 is an example of the mapping table of the RIC 33, which includes the mapping association associated with the IP address of the UAV 31 and the RAN UE ID.

In step S426, the core network 34 transmits the packet to the UWD location provider U, and the UWD location provider U obtains the IP address corresponding to the UAV 31 according to the packet. In step S427, the UWD location provider U accepts the registration request of the UAV 31 with the IP address corresponding to the UAV 31.

In step S428, when the UWD location provider U transmits enrichment information and the IP address corresponding to the UAV 31 to the RIC 33, the RIC 33 queries the mapping association in the mapping table according to the IP address corresponding to the UAV 31 to obtain the RAN UE ID corresponding to the UAV 31. Specifically, when the RIC 33 wants to perform resource control on the UAV 31, the RIC 33 may obtain the RAN UE ID corresponding to the UAV 31 from the mapping table according to the IP address corresponding to the UAV 31, and in step S429, transmit the control request carrying the RAN UE ID to the base station 32. In step S330, the base station 32 transmits the enrichment information to the UE 31 corresponding to the RAN UE ID, and makes relevant configurations for the UAV 31.

When another user equipment UAV 35 wants to obtain network services from the base station 32, in step S441, the UAV 35 initiates a networking request to the base station 32 and completes the networking request by executing operations similar to steps S402 to S404. Once the UAV 35 and the base station 32 complete the network connection establishment, the operations similar to steps S421 to S425 may be executed to establish a mapping association between the RAN UE ID and the IP address of the UAV 35 in the mapping table of the RIC 33. Then, the operations similar to steps S426 to S430 are performed to transmit the packet of the UAV 35 to the UWD location provider U through the core network 34. The UWD location provider U obtains the IP address corresponding to the UAV 35 according to the packet, and uses the IP address corresponding to the UAV 35 to accept the registration request of the UAV 35. When the UWD location provider U transmits enrichment information and the IP address corresponding to the UAV 35 to the RIC 33, the RIC 33 queries the mapping association in the mapping table according to the IP address corresponding to the UAV 35 to obtain the RAN UE corresponding to the UAV 35 ID.

In summary, the method and system for identifying user equipment provided by the present disclosure may obtain the RAN UE ID from the RIC when the UE is connected to the base station. After the UE transmits the packet, the packet passes through the base station, and the base station obtains the IP address of the UE in the packet, and establish a mapping table between the RAN UE ID and the IP address is in the RIC. When the enrichment information provider uses the IP address associated with the UE to communicate with the RIC, it can be acquired by looking up the table which UE needs to be used for radio resource control.

What is claimed is:

1. A system for identifying a user equipment (UE), comprising:
- a base station configured to generate a radio access network UE identifier (RAN UE ID) of the UE, and
- a radio access network intelligent controller (RIC) connected to the base station;
- wherein when the UE submits a registration request to an enrichment information provider, the base station receives a packet of the UE, obtains an IP address corresponding to the UE based on the packet, and transmits the packet to a core network;
- wherein the base station transmits the IP address and the RAN UE ID corresponding to the UE to the RIC;
- wherein the RIC establishes a mapping association associated with the IP address of the UE and the RAN UE ID in a mapping table;
- wherein the core network transmits the packet to the enrichment information provider, and the enrichment information provider obtains the IP address corresponding to the UE according to the packet, and accepts the registration request of the UE with the IP address.

2. The system for identifying the UE according to claim 1, wherein when the enrichment information provider transmits enrichment information and the IP address to the RIC, the RIC queries the mapping association in the mapping table according to the IP address to obtain the RAN UE ID, and the base station transmits the enrichment information to the UE corresponding to the RAN UE ID.

3. The system for identifying the UE according to claim 1, wherein when the base station receives a networking request of the UE, the base station transmits the RAN UE ID corresponding to the UE to the RIC, and the RIC responds to the base station to complete the networking request.

4. The system for identifying the UE according to claim 3, wherein the base station transmits the RAN UE ID corresponding to the UE to the RIC through an E2 interface.

5. The system for identifying the UE according to claim 1, wherein the base station transmits the IP address and the RAN UE ID corresponding to the UE to the RIC through an E2 interface.

6. A method for identifying a user equipment (UE), comprising:
- generating a radio access network UE identifier (RAN UE ID) corresponding to the UE through a base station;
- when the UE submits a registration request to an enrichment information provider, receiving a packet of the UE through the base station, obtaining an IP address corresponding to the UE based on the packet, and transmitting the packet to a core network;
- transmitting the IP address and the RAN UE ID corresponding to the UE to a radio access network intelligent controller (RIC) through the base station;
- establishing a mapping association associated with the IP address of the UE and the RAN UE ID in a mapping table through the RIC; and
- transmitting the packet to the enrichment information provider through the core network, wherein the enrichment information provider obtains the IP address corresponding to the UE according to the packet, and accepts the registration request of the UE with the IP address.

7. The method for identifying the UE according to claim 6, comprising:
- when the enrichment information provider transmits enrichment information and the IP address to the RIC, querying the mapping association in the mapping table according to the IP address through the RIC to obtain the RAN UE ID, and transmitting the enrichment information to the UE corresponding to the RAN UE ID through the base station.

8. The method for identifying the UE according to claim 6, comprising:
- when the base station receives a networking request of the UE, transmitting the RAN UE ID corresponding to the UE to the RIC through the base station, wherein the RIC responds to the base station to complete the networking request.

9. The method for identifying the UE according to claim 8, wherein the base station transmits the RAN UE ID corresponding to the UE to the RIC through an E2 interface.

10. The method for identifying the UE according to claim 6, wherein the base station transmits the IP address and the RAN UE ID corresponding to the UE to the RIC through an E2 interface.

* * * * *